(12) United States Patent
Mangla et al.

(10) Patent No.: US 11,758,279 B2
(45) Date of Patent: Sep. 12, 2023

(54) WDR IMAGING WITH LED FLICKER MITIGATION

(71) Applicant: Texas Instruments Incorporated, Dallas, TX (US)

(72) Inventors: Mayank Mangla, Allen, TX (US); Shashank Dabral, Allen, TX (US); Peter Labaziewicz, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/213,286

(22) Filed: Mar. 26, 2021

(65) Prior Publication Data

US 2021/0218877 A1 Jul. 15, 2021

Related U.S. Application Data

(63) Continuation of application No. 15/296,152, filed on Oct. 18, 2016, now Pat. No. 10,992,876.

(51) Int. Cl.
*H04N 5/235* (2006.01)
*H01L 27/146* (2006.01)
(Continued)

(52) U.S. Cl.
CPC ............. *H04N 23/741* (2023.01); *G06T 5/50* (2013.01); *H04N 23/56* (2023.01); *H04N 23/74* (2023.01);
(Continued)

(58) Field of Classification Search
CPC .. H04N 5/2355; H04N 5/2256; H04N 5/2354; H04N 5/2356; H04N 5/2357;
(Continued)

(56) References Cited

U.S. PATENT DOCUMENTS 5,909,244 A * 6/1999 Waxman ................ H04N 5/335
348/E5.073
6,359,274 B1 3/2002 Nixon
(Continued)

FOREIGN PATENT DOCUMENTS

| CN | 203552276 U | 4/2014 |
| CN | 104322051 A | 1/2015 |
| EP | 2606637 B1 | 9/2016 |

OTHER PUBLICATIONS

International Search Report and Written Opinion, PCT/US 2017/057266, dated May 17, 2018 (7 pages).
(Continued)

*Primary Examiner* — Patrick E Demosky
(74) *Attorney, Agent, or Firm* — Michael T. Gabrik; Frank D. Cimino

(57) ABSTRACT

A method of WDR imaging. Exposure times (ETs) are set for first and second frames for an image sensor to avoid second frame saturating by setting a second ET>1/a PWM frequency applied to an LED illuminating a scene to generate second longer ET pixel data (PD). The first frame has first PD and a first ET<the second ET. A high and low intensity threshold are calculated from a full well capacity. Raw image signals are obtained originating from the image sensor of the scene. Flicker is detected by comparing the first and second frame intensity values to the high and low threshold to determine whether the first PD is flickering data. A WDR merge is performed by selecting weightings from the first and second PD for each pixel including increasing weighting of the second PD for flicker. A final image is formed from the weighted WDR merge.

20 Claims, 6 Drawing Sheets

(51) Int. Cl.
    *H04N 23/741*     (2023.01)
    *G06T 5/50*     (2006.01)
    *H04N 23/56*     (2023.01)
    *H04N 23/74*     (2023.01)
    *H04N 23/743*     (2023.01)
    *H04N 23/745*     (2023.01)

(52) U.S. Cl.
    CPC ......... *H04N 23/743* (2023.01); *H04N 23/745* (2023.01); *G06T 2207/10144* (2013.01); *G06T 2207/20208* (2013.01)

(58) Field of Classification Search
    CPC .. H04N 5/235; H04N 5/3532; H04N 5/35554; H04N 13/00; H04N 5/35581; G06T 5/50; G06T 2207/10144; G06T 2207/20208; G06T 5/007; H01L 27/146
    See application file for complete search history.

(56) References Cited

U.S. PATENT DOCUMENTS

| | | |
|---|---|---|
| 9,131,172 B2 | 9/2015 | Tsuzuki |
| 10,992,876 B2 * | 4/2021 | Mangla .................... G06T 5/50 |
| 2004/0143380 A1 | 7/2004 | Stam |
| 2011/0069200 A1 | 3/2011 | Oh et al. |
| 2011/0267519 A1 | 3/2011 | Wright |
| 2012/0044381 A1 * | 2/2012 | Jannard .................... G06T 5/007 |
| | | 348/E5.037 |
| 2012/0050474 A1 * | 3/2012 | Segall .................. H04N 19/527 |
| | | 348/E13.001 |
| 2012/0187275 A1 * | 7/2012 | Shirai .................... G01B 11/24 |
| | | 250/201.4 |
| 2013/0147979 A1 | 6/2013 | McMahon |
| 2014/0152694 A1 | 6/2014 | Narasimha |
| 2016/0191158 A1 | 6/2016 | Aoyama |
| 2017/0347047 A1 | 11/2017 | Mao |

OTHER PUBLICATIONS

Notice of Issuance of Office Action; PRC (China) Pat. Appln. No. 201780064401.5; dated Mar. 2, 2021.

First CN Office Action;PRC (China) Pat. Appln. No. 201780064401.5; dated Mar. 2, 2021.

Translation; First CN Office Action;PRC (China) Pat. Appln. No. 201780064401.5; dated Mar. 2, 2021.

* cited by examiner

WDR IMAGING WITH LED FLICKER MITIGATION

CROSS-REFERENCE TO RELATED APPLICATIONS

This continuation application claims priority to U.S. patent application Ser. No. 15/296,152, filed Oct. 18, 2016, which is hereby incorporated herein by reference in its entirety.

FIELD

Disclosed embodiments relate to wide dynamic range (WDR) image processing.

BACKGROUND

Some next generation photodetectors provide a WDR output and are thus considered WDR image sensors. When a photographed image, such as from WDR image sensors, includes some of its pixels with bright regions and some other pixels with dark regions due to significant differences in the illumination intensity of the scene, an image of the scene clearly showing features in both the bright regions and dark regions cannot be obtained even when the exposure time and the aperture are properly adjusted. High dynamic range (HDR) imaging is an imaging technique that combines pixels from multiple frames (or exposures) having different exposure times, apertures, shutter speed and/or sensitivity of the same picture (scene) with some pixels from each frame being used in the final image to encompass the brightness range of the entire frame set, generally so that the obtained picture covers the same dynamic range a human's eyes would. WDR imaging is a term used in the camera industry to refer to HDR imaging, where as used herein WDR imaging also refers to HDR imaging.

Pulse Width Modulation (PWM) used in operating light emitting diode (LED) bulbs is known to cause complementary metal oxide semiconductor (CMOS) image sensors to periodically miss sampling a part of the signal. The effect is that light from the LED bulbs as seen in a camera's output appears to be oscillating between ON and OFF levels including partially ON where one of the colors may appear. This effect is commonly known as "flicker" and is a limitation of CMOS sensor technology.

A majority of camera systems including automotive cameras are based on CMOS image sensors. LED lighting is also becoming popular in car lights, road signs and traffic signs. While cameras are becoming ubiquitous, the flicker problem remains largely unsolved. WDR imaging makes it even more challenging to avoid flicker because of the relatively short integration time needed to capture light from LED light bulbs. WDR is a key requirement for camera systems which are safety critical or require high image quality.

Known flicker mitigation includes setting constraints on the minimum exposure time to avoid saturation. The disadvantages for this technique includes the bright regions in the scene need a short exposure time, and setting constraints on the exposure time causes these pixels to get overexposed. This causes a loss of dynamic range. This constraint will be present even if the LED bulbs are not in the current scene being imaged. Accordingly, this flicker mitigation technique results in a permanent loss of dynamic range, even when flicker mitigation is not needed.

Another flicker mitigation method uses post-merge image processing to artificially remove flicker after it has entered the merged image. Disadvantages for this post-merge method include artifacts and other side effects on image quality, and the inability to differentiate between flicker induced oscillation and an actual oscillation occurring in the scene (e.g., a turn signal, ambulance signal, etc.).

SUMMARY

This Summary briefly indicates the nature and substance of this Disclosure. It is submitted with the understanding that it will not be used to interpret or limit the scope or meaning of the claims.

Disclosed embodiments recognize known flicker mitigation methods largely do not solve the LED flicker-induced WDR imaging problem. Disclosed embodiments provide a method for a WDR-merge including LED-induced flicker mitigation. Flicker is detected based on the signal level (intensity) in the plurality of different exposure frames (or channels). The detection results are used to determine the weighting of the respective pixel data so that the WDR merge is performed on the image data that has a reduced weighting from pixel data from the flickering pixels which results in maximizing the dynamic range while keeping the flicker in the merged image under control.

Pixel-by-pixel detection is used, and if flicker is not detected, the WDR merge precedes with disclosed flicker mitigation being disabled. Flicker correction is possible for multiple flickering LED sources in the scene. For example, if there are more than 1 LED bulb in the scene emitting at 2 or more different frequencies, disclosed LED-induced flicker mitigation is still able to mitigate the flicker effect by setting the exposure time for the longest exposure time frame to be greater than the time period of the lowest frequency LED that the imaging system is handling the image processing of.

BRIEF DESCRIPTION OF THE DRAWINGS

Reference will now be made to the accompanying drawings, which are not necessarily drawn to scale, wherein.

DETAILED DESCRIPTION

Figure 1:
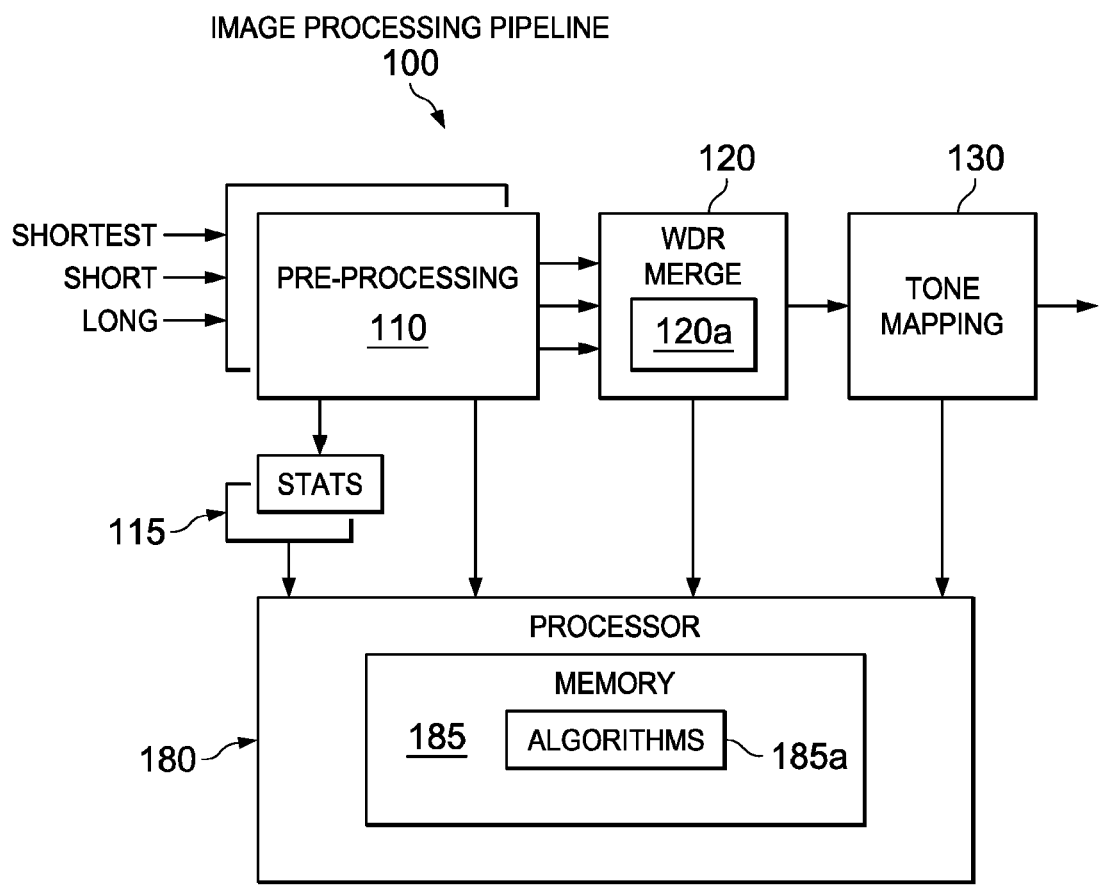
FIG. 1 is a block diagram representation of an example image processing pipeline that implements WDR imaging where the merge includes LED-induced flicker mitigation.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

In a multi-exposure WDR camera system, several (e.g., 3) images taken at different exposure time settings are merged together to create a WDR image. Sensor pixels impinged with high intensity light need saturation control, while pixels impinged within the dark portion of the image need longer exposure (or integration) times. The merge operation includes selecting pixels from different frames of same scene based on the signal to noise ratio (SNR) which as known in the art is the ratio of the peak light intensity without saturation to the scene background noise. WDR is effective for capturing both very bright and very dark objects in the same scene. Disclosed methods of flicker mitigation change known WDR merging to now include flicker mitigation which enables mitigating the LED flicker when present in a scene.

FIG. 1 is a block diagram representation of an example image processing pipeline 100 that implements disclosed WDR merge including LED-induced flicker mitigation. Image processing pipeline 100 includes in serial combination a pre-processing block 110, WDR merge block 120 including a disclosed flicker mitigation algorithm 120a, and an optional tone mapping block 130. Image processing pipeline 100 is shown implemented by a processor 180 (e.g., central processing (CPU) comprising a microprocessor, digital signal processor (DSP), or a microcontroller unit (MCU)) having an associated memory 185 storing a plurality of algorithms 185a. The plurality of algorithms 185a implemented by the processor 180 include the flicker mitigation algorithm 120a for the WDR merge 120, and a tone mapping algorithm for implementing the tone mapping block 130.

The input raw pixel data originating from an image sensor shown received by pre-processing block 110 can be in the form of Bayer, RCCC, RGBC, or more generally in any format. The image sensor can comprise a WDR sensor(s), which is generally a CMOS WDR sensor. However, as known in the art, WDR imaging is possible without WDR sensors. For example, some smartphones use non-WDR image sensors that with software processing provide a WDR effect. Pixel data from the three different frames having different exposures times is shown received from (or originating from) an image sensor including a frame having a shortest exposure time (corresponding to the lowest brightness/intensity), a frame having a relatively short exposure time (corresponding to an intermediate brightness intensity), and a frame having a long exposure time (corresponding to the highest brightness intensity), all shown input to the pre-processing block 110.

The image pre-processing performed by the pre-processing block 110 includes applying multiple known algorithms generally including defective pixel correction (DPC), lens shading correction (LSC), noise filtering (NF), white balance (WB), and statistics collection. Statistics collection (Stats) 115 comprises statistics for all frames used, such as statistics for the long exposure time frame (Long), the short exposure time frame (Short), and a shortest exposure time frame (Shortest) shown in FIG. 1. The raw pixel data can come directly from an image sensor (e.g., color camera) in effectively real-time or from a memory (e.g. a double data rate synchronous dynamic random-access memory (SDRAM DDR)) storing raw pixel data originating from an image sensor.

The WDR merge block 120 receives the respective frames with long, short and shortest pixel data after processing by the pre-processing block 110. WDR merge block 120 implements method 200 or method 300 described below where flicker if present in each pixel is detected based on the signal level in the plurality of different exposure times frames (shown as long, short and shortest), and flicker when detected is then mitigated.

The tone mapping block 130 follows the WDR merge block 120 is for reducing the dynamic range (i.e., less bits), or contrast ratio, of the full color image while retaining localized contrast to provide a tone mapped image. A demosaicing (or de-mosaicing) algorithm which is a digital image process that reconstructs a full color image can follow the tone mapping block 130.

Figure 2:
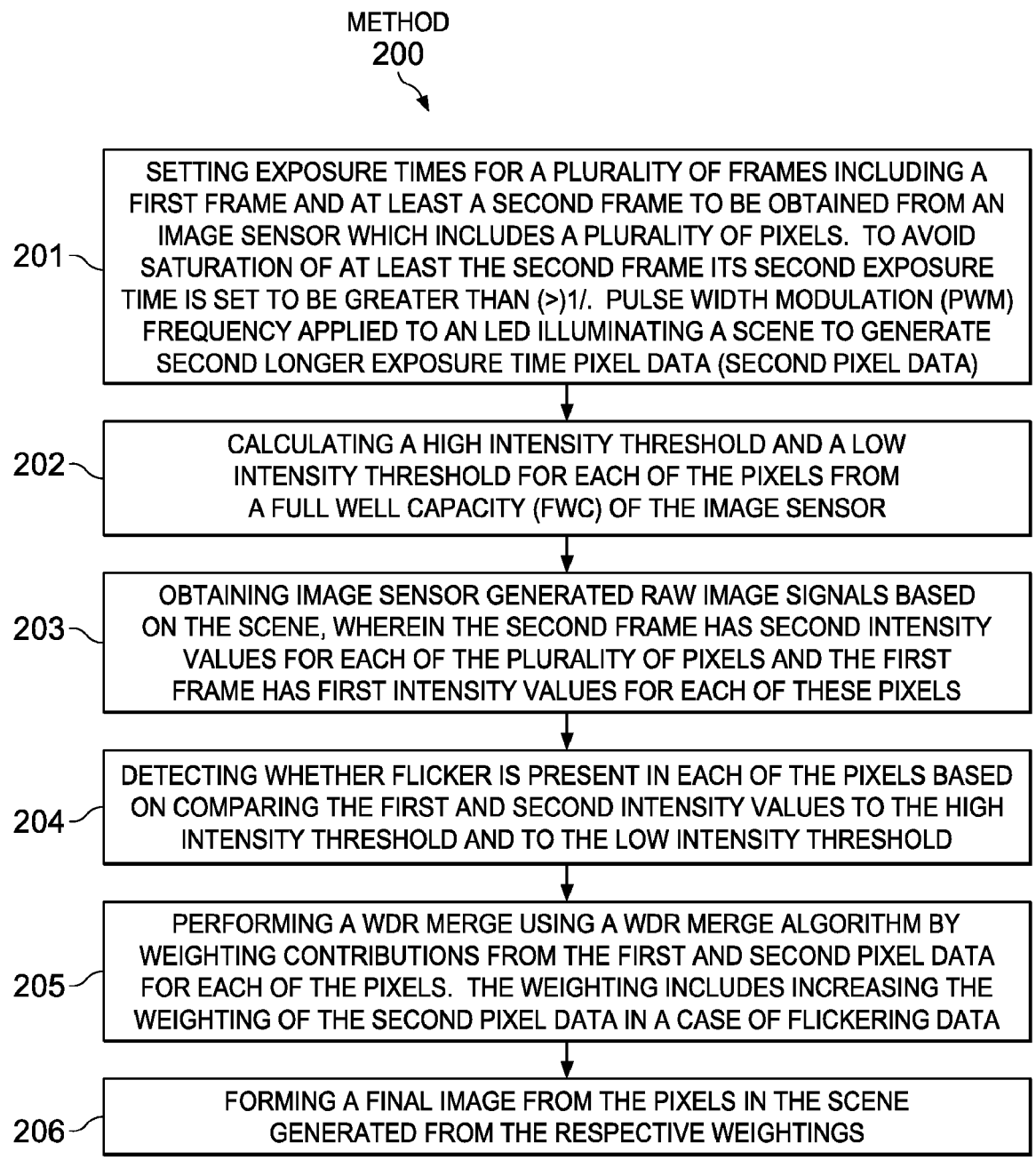
FIG. 2 is flow chart that shows steps in an example method of WDR imaging where the WDR merge includes LED-induced flicker mitigation, according to an example embodiment.

FIG. 2 is flow chart that shows steps in an example method 200 of WDR imaging including a WDR merge with LED-induced flicker mitigation, according to an example embodiment. Step 201 comprises setting exposure times for a plurality of frames including a first frame and at least a second frame to be obtained from an image sensor which includes a plurality of pixels. To avoid saturation of a least the second frame its second exposure time is set to be greater than (>) 1/pulse width modulation (PWM) frequency applied to an LED illuminating the scene to generate second longer exposure time pixel data (second pixel data). Optionally, beside exposure times, gains may also be set.

The first frame has a first exposure time for generating first shorter exposure time pixel data (first pixel data). This second exposure time is thus set to be greater than the time period corresponding to the lowest PWM LED frequency the imaging system is designed to handle. As known in the art, on/off data can be sent to an LED driver coupled to an LED to emulate the effect of PWM intensity control. For example, a 90 Hz (PWM frequency) LED requires an integration time>$\frac{1}{90}$ sec$^{-1}$>11.1 msec.

Step 202 comprises calculating a high intensity threshold and a low intensity threshold for each of the pixels from a full well capacity (FWC) of the pixels of the image sensor. The FWC defines the amount of charge an individual pixel can hold before saturating and the FWC value is generally provided by the manufacturer of image sensor, typically provided on the image sensor's datasheet. The high intensity threshold is calculated from the FWC. The low intensity threshold is calculated from the FWC divided by the intensity ratio. An auto-exposure algorithm can be used which utilizes images of the scene of interest captured previously to provide the intensity ratio for the frames to be captured.

Step 203 comprises obtaining image sensor generated raw image signals based on the scene. The second frame has second intensity values for each of the plurality of pixels and the first frame has first intensity values for each of these pixels.

Step 204 comprises detecting whether flicker is present in each of the pixels based on comparing the first and second intensity values to the high intensity threshold and to the low intensity threshold. This comparing step determines whether the first pixel data in each of the pixels is flickering data. Step 205 comprises performing a WDR merge using a WDR merge algorithm by weighting contributions from the first and second pixel data for each of the pixels. The weighting includes increasing the weighting of the second pixel data (with the longer exposure time) in a case of flickering data. While performing the merge operation, the pixel data is weighed based on its SNR as known in the art. Step 206 comprises forming a final image from the pixels in the scene generated from the respective weightings.

Figure 3:
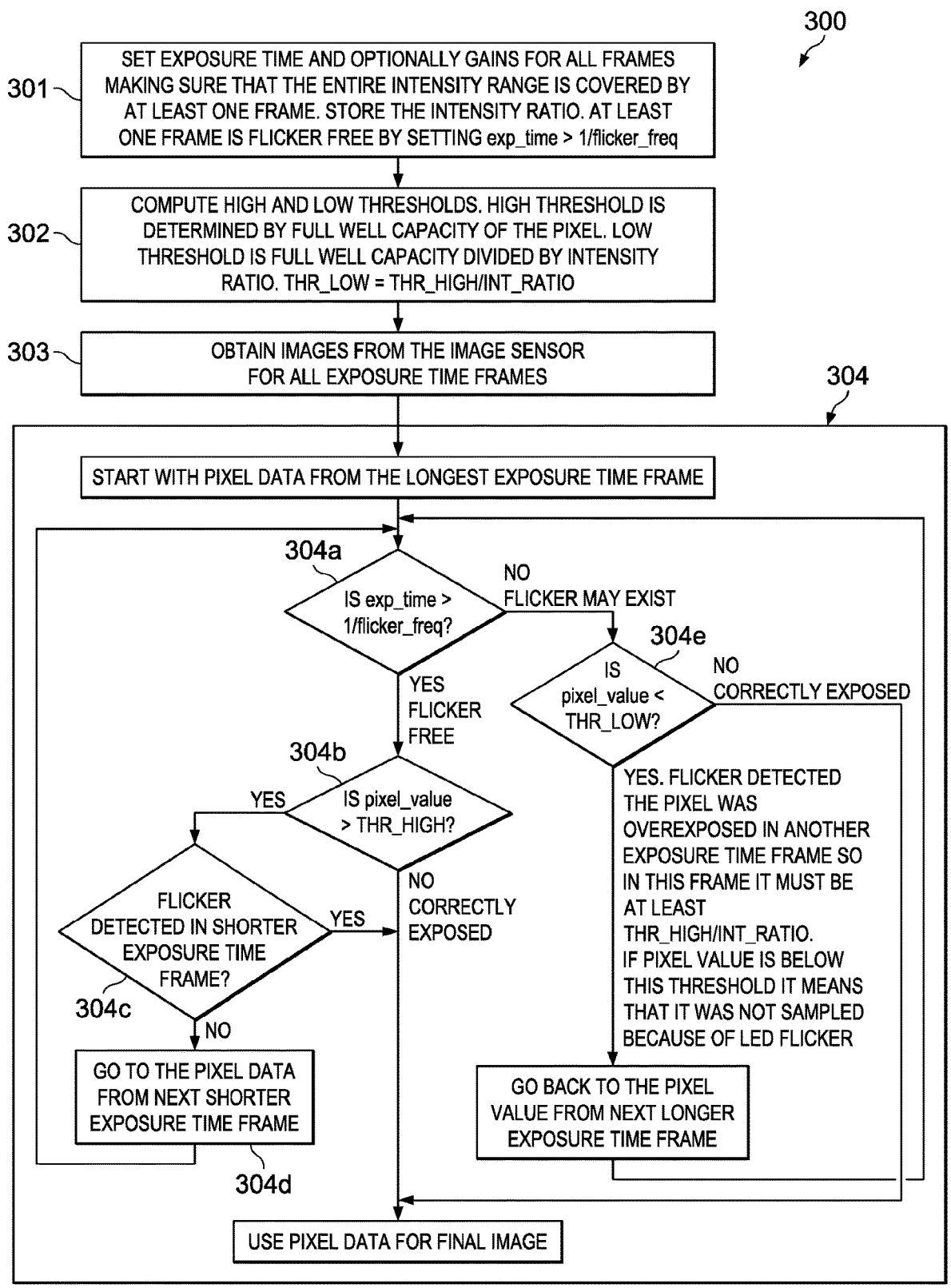
FIG. 3 is a more detailed flow chart that shows steps in another example method of WDR imaging where the WDR merge includes LED-induced flicker mitigation, according to an example embodiment.
Figure 4A:
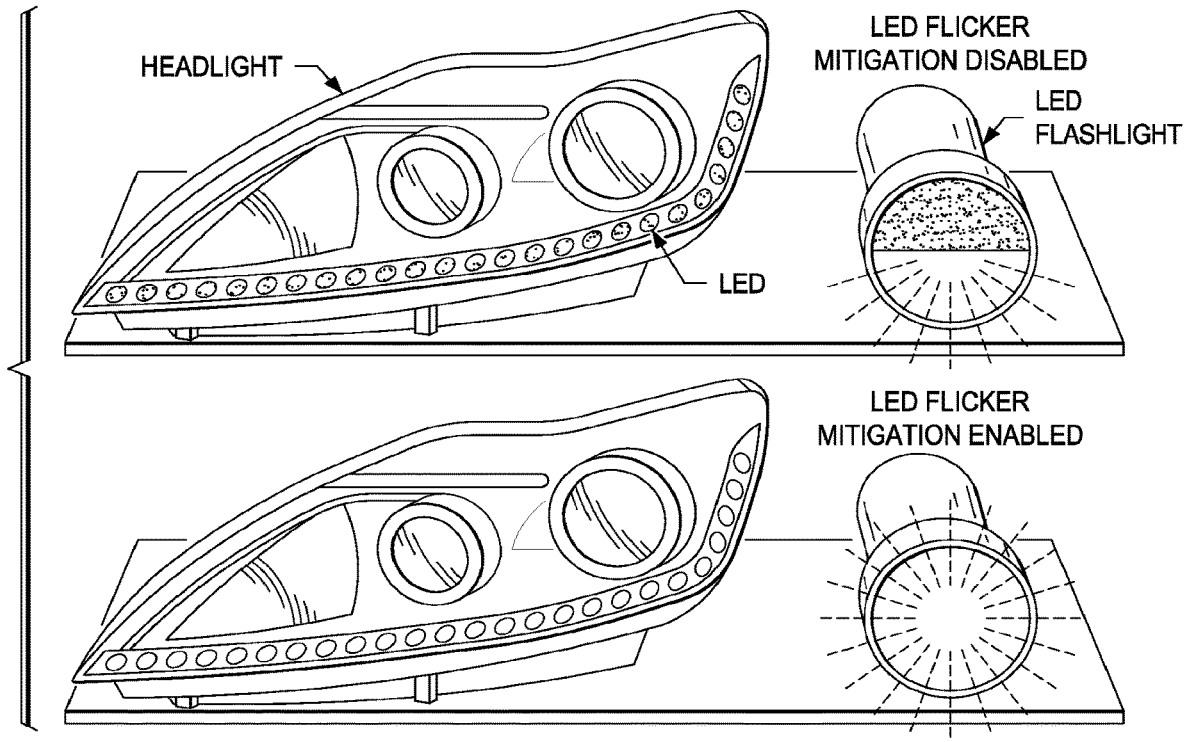
FIGS. 4A-4D show scanned imaging results for a time-lapsed sequence showing imaging results from an existing WDR imaging method that lacks any LED flicker mitigation (flicker mitigation disabled) shown at the top and from a disclosed method of WDR imaging that included a WDR merge with LED-induced flicker mitigation shown at the bottom.
Figure 4B:
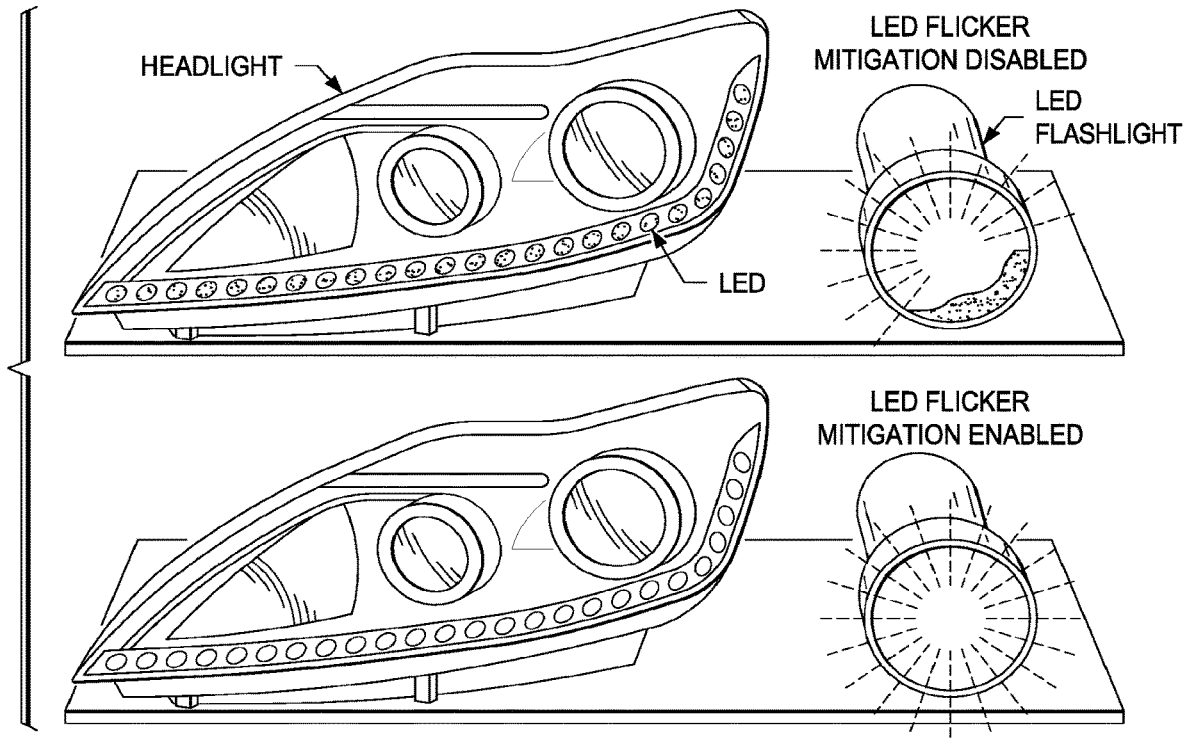
Figure 4C:
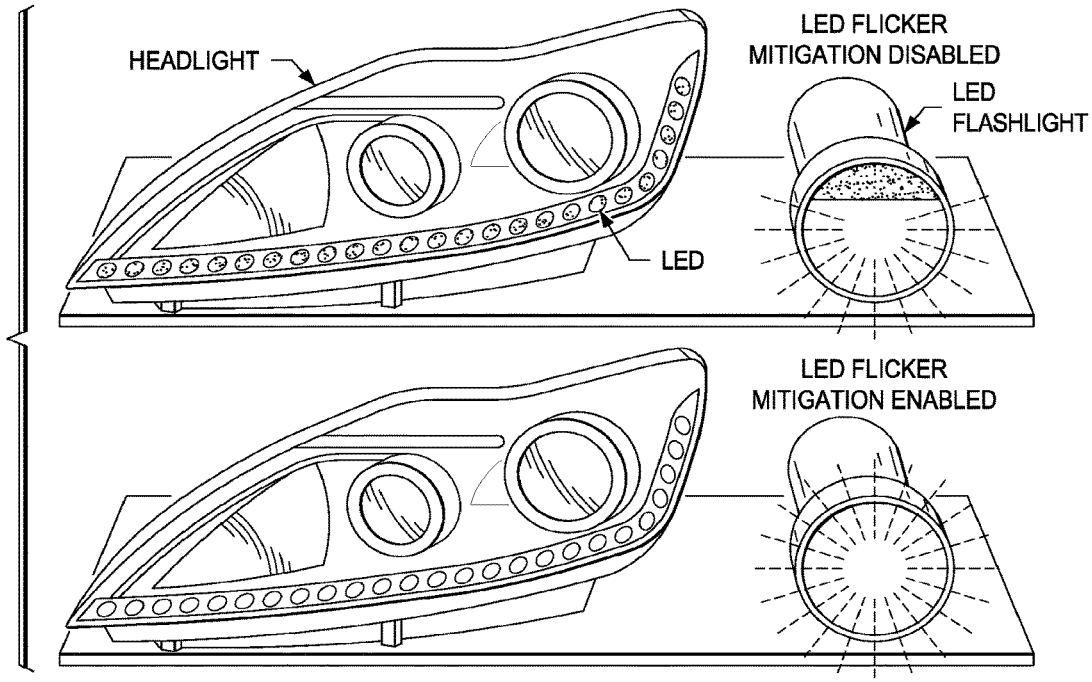
Figure 4D:
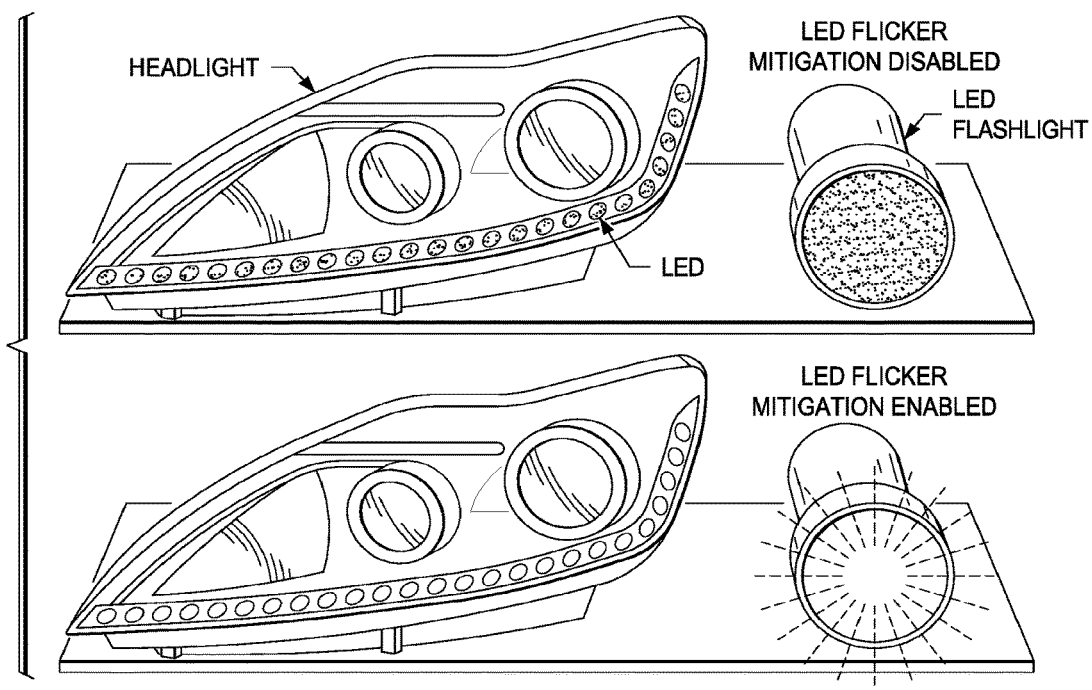

FIG. 3 is a more detailed flow chart that shows steps in an example iterative method 300 of WDR imaging comprising WDR merging including LED-induced flicker mitigation, according to an example embodiment. Step 301 comprises setting exposure times and optionally setting gains for all the frames making sure the entire intensity range in the scene is covered by at least one of the frames. The intensity ratio is stored. As described above at least one of the frames is flicker-free by setting an exposure time of the longest exposure time frame>1/the PWM frequency. Setting gains is not always required, and generally depends on scene conditions and sensor architecture. Setting gains can involve an I2C (a multi-master, multi-slave, single-ended, serial computer) transaction from an image processing system (such as implemented as a system-on-a-chip (SoC), see ADAS system 500 in FIG. 5 described below) to the image sensor.

Step 302 compromises computing high and low thresholds. The high threshold is computed from the FWC of the image sensor. The low threshold is the FWC divided by the intensity ratio stored in step 301.

Step 303 comprises obtaining images from the image sensor for all the frames, such as 3 frames (e.g., Long, Short and Shortest shown in FIG. 1) in a typical embodiment. As noted above, the images can be obtained directly from the image sensor in real-time or from a memory storing the image sensor data.

Step 304 comprises flicker detection, and if flicker is detected, flicker mitigation is performed pixel-by-pixel for each pixel in the image. Step 304 starts with pixel data from the longest exposure time frame (e.g., the "Long" exposure time frame shown in FIG. 1). Step 304a comprises determining whether the exposure time is >1/the PWM frequency. If a yes results from step 304a, the pixel data is determined to be flicker-free and step 304b is reached which determines whether the intensity value for the pixel data (pixel data value) is >the high threshold. As step 304 starts with a pixel from the longest exposure time frame which has an exposure time>1/the PWM frequency ensured at the time of setting exposure times for the Long frame in step 301, the first pass at step 304a always results in a yes (flicker-free) result.

If a no results from step 304a, such as from a second pass with a pixel from a shorter exposure time frame after the first pass with a pixel from the longer exposure time frame step 304b results in a yes result and step 304c is a no result, flicker may exist and step 304e is reached which determines if the pixel data value<the low threshold. If a yes results at step 304e, the method returns to step 304a using a pixel data value from the next higher (longer) exposure time frame.

In a simplest 2 frame with only a long exposure time and short exposure time frame imaging arrangement, the next longer exposure time is the long exposure time frame. In this case, once step 304e results in a yes result, the decision results in going back to the long frame. Step 304a and 304b again result in a yes result which thus reaches step 304c. In the previous iteration step 304c resulted in a no result because the short frame was not analyzed. Now the short frame has been analyzed, flicker has been detected, so that step 304c results in a yes result so that there is no return back to short frame. Instead the long frame pixel is used for the pixel being processed for the final merge.

If a yes results from step 304b, step 304c is reached which determines if flicker is detected in the shorter exposure time frame. (e.g., Short in FIG. 1). Flicker was tested in step 304e. The result from the test in step 304e is stored in memory and retrieved upon reaching step 304c. If a no results from step 304b, the pixel data is determined to be correctly exposed and the pixel data is used (either alone or weighed) for a pixel in the final image. In step 304c, if flicker is detected in a lower (shorter) exposure time frame the pixel data value from lower exposure time frame is not used for the final image. In step 304c, if flicker is not detected in a pixel from a shorter exposure time frame, step 304d is reached which accesses the pixel data from the next lower exposure time (e.g., Long to Short) frame and this pixel data is sent to step 304a to repeat the above sequence.

Advantages of disclosed WDR imaging including a WDR merge with LED-induced flicker mitigation include better picture/video quality without the annoying effect of flicker caused by LED light sources because the artifacts caused by the LED are removed. A typical scenario is an automotive camera in an ADAS system (such as ADAS system 500 shown in FIG. 5 described below) 'looking' at a road sign or lights of another car, where the annoying effect of flickering light bulbs or road signs is eliminated thus improving safety. The accuracy of computer vision algorithms is also improved by providing a more robust video stream.

Disclosed WDR imaging also helps distinguish between flicker and periodically oscillating light sources because of disclosed detection logic. With a periodic signal, both the Long and the Short exposure time frames will be below the low threshold (THR_L) when the LED signal is OFF. In case of flicker, the long exposure time frame will be above the high threshold (THR_H) and thus considered saturated and the short exposure time frame will be below the low threshold (THR_L) and thus considered not sampled. Disclosed WDR imaging also ensures that turn LED signals, police car signals and ambulance signals are not forcefully altered which overcomes the problem caused when using conventional post-processing based flicker mitigation which tries to "fix" every otherwise final pattern which has symptoms of LED flicker.

EXAMPLES

Disclosed embodiments are further illustrated by the following specific Examples, which should not be construed as limiting the scope or content of this Disclosure in any way.

FIGS. 4A-4D show scanned imaging results for a time-lapsed sequence showing imaging results from an existing WDR imaging method that lacks any LED flicker mitigation (LED flicker mitigation disabled) shown at the top and from a disclosed method of WDR imaging that included a WDR merge with LED-induced flicker mitigation (LED flicker mitigation enabled) shown at the bottom. The same scene is shown in FIGS. 4A-4D and the lighting, optics and image signal processor (ISP) settings other than flicker mitigation were held constant. The LED flashlight shown to the right was modulated at a frequency of 120 Hz and the automotive LED headlight shown to the left was modulated at 160 Hz.

The exposure times used were 256 ms, 16 ms and 1 ms for the L, M and S frames, respectively.

The 120 Hz LED flashlight required an integration time>8.33 msec to be flicker-free, and the 160 Hz LED headlight required an integration time>6.25 msec to be flicker-free. Accordingly, in this Example the L and M frames will be always flicker-free, while the S frame can experience flicker, resulting in random flicker for WDR images when disclosed LED flicker mitigation is disabled. The output image from disclosed WDR imaging including LED-induced flicker mitigation is shown flicker-free in all four images. In contrast, the output images without disclosed LED-induced flicker mitigation is shown to always have significant evidence of random LED-induced flicker in the image around the LED flashlight and LEDs in the headlight as shown in FIGS. 4A-4D.

Figure 5:
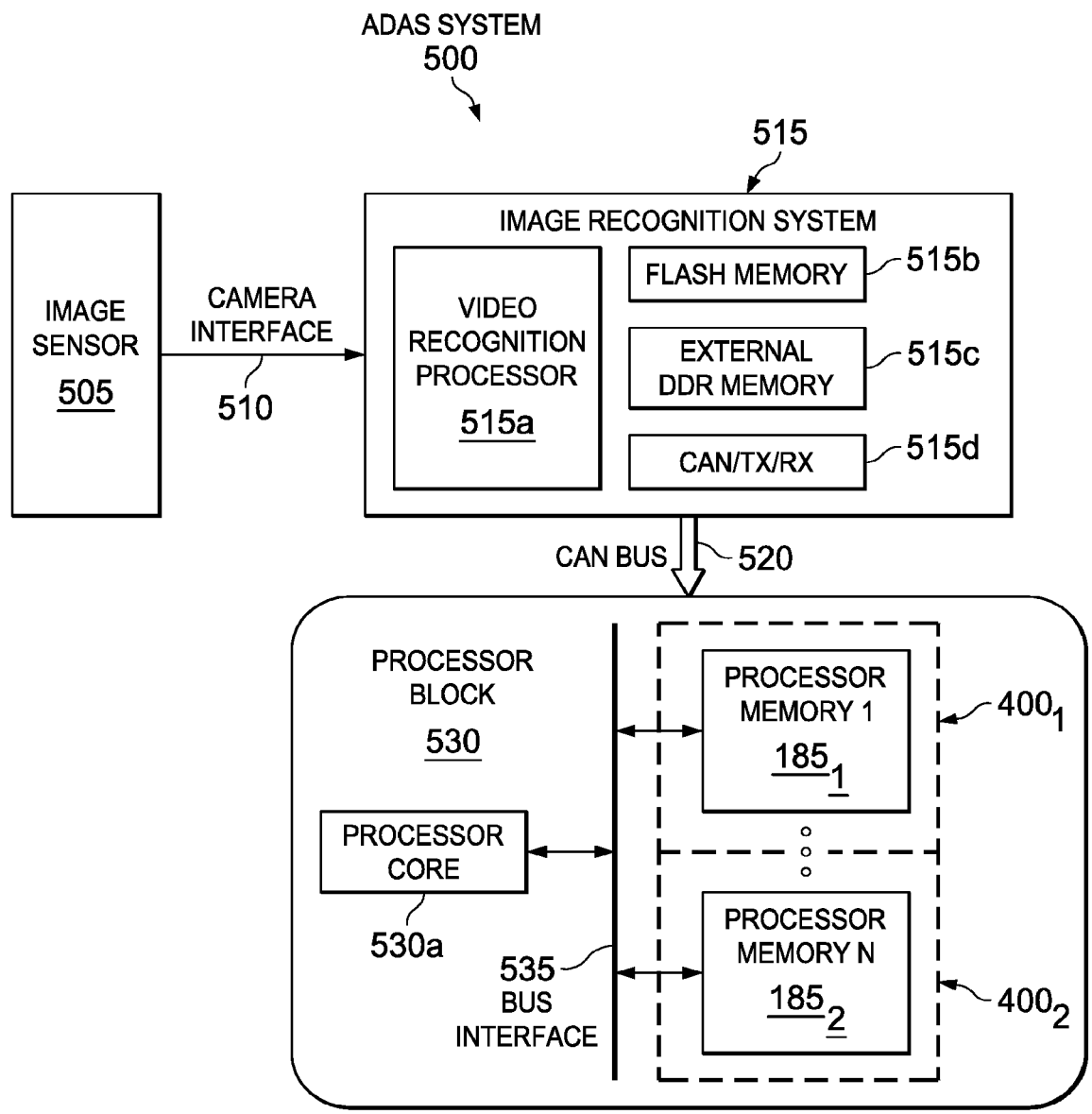
FIG. 5 is a system diagram of an example ADAS system that implements disclosed WDR imaging where the WDR merge includes LED-induced flicker mitigation, according to an example embodiment.

FIG. 5 is a system diagram of an example ADAS system 500 that implements disclosed WDR imaging where the WDR merge includes LED-induced flicker mitigation, according to an example embodiment. System 500 includes two instances of error correction code (ECC) memory $400_1$ and $400_2$ including processor memory $185_1$ (shown as processor memory 1) and $185_2$ (shown as processor memory N). An image sensor 505 (e.g. a color WDR camera) generates image data from a scene that may include at least one LED (e.g., from a rear-view from an automobile). The image data is coupled to an image recognition system 515 by a camera interface 510. Image recognition system 515 is shown including a video recognition processor 515a, flash memory 515b, external DDR memory 515c, and a controller area network (CAN) bus Tx/Rx (transceiver) 515d.

The image recognition system 515 is coupled by a CAN bus 520 to the processor block 530 that includes a processor core 530a. Processor core 530a is shown coupled by a bus interface 535 to utilize the processor memory $185_1$ and $185_2$ of ECC memory circuits $400_1$ and $400_2$. The entire ADAS system 500 can be embodied as a system-on-ship (SoC) except generally the image sensor 505. The video recognition processor 515a, CAN bus Tx/Rx (transceiver) 515d, CAN bus 520, and other features shown in FIG. 5 are not requirements for a disclosed ADAS system.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A method comprising:
   receiving, by at least one processor from an imaging system, a first plurality of pixel data having a first exposure time;
   receiving, by the at least one processor from the imaging system, a second plurality of pixel data having a second exposure time greater than the first exposure time;
   detecting, by the at least one processor, whether flicker is present in the first plurality of pixel data;
   detecting whether the second plurality of pixel data is in a saturation state;
   selecting, by the at least one processor, a first or a second set of merging weights based on whether or not flicker is detected in the first plurality of pixel data and whether or not the second plurality of pixel data is in the saturation state, in which the first set of merging weights weight the second plurality of pixel data more heavily than the first plurality of pixel data, and in which the second set of merging weights weight the first plurality of pixel data more heavily than the second plurality of pixel data; and
   merging, by the at least one processor, the first plurality of pixel data and the second plurality of pixel data, using the selected first or second set of merging weights, to generate a merged image.

2. The method of claim 1, further comprising setting the second exposure time to be greater than an inverse of a frequency of a light-emitting diode (LED) of a plurality of LEDs, and
   wherein LEDs of the plurality of LEDs have different frequencies.

3. The method of claim 1, wherein detecting flicker in the first plurality of pixel data comprises detecting flicker by the at least one processor in response to determining that pixel data in the first plurality of pixel data is below a low intensity threshold.

4. The method of claim 3, further comprising determining the low intensity threshold based on a full well capacity of an image sensor divided by an intensity ratio.

5. The method of claim 4, wherein the image sensor comprises a complementary metal oxide semiconductor (CMOS) WDR sensor.

6. The method of claim 4, wherein the image sensor is mounted on an automobile.

7. The method of claim 1, wherein the first set of merging weights sets a weight of the first plurality of pixel data to zero.

8. The method of claim 1, further comprising performing tone mapping on the merged image, to generate a tone mapped image.

9. An advanced driver assistance system (ADAS), comprising:
   at least one processor; and
   an imaging system,
   the at least one processor configured to:
      receive a first plurality of pixel data having a first exposure time from the imaging system;
      receive a second plurality of pixel data having a second exposure time from the imaging system, wherein the first exposure time is less than the second exposure time;
      detect whether flicker is present in the second plurality of pixel data;
      detect whether the second plurality of pixel data is in a saturation state;
      select a first or second set of merging weights based on whether or not flicker is detected in the first plurality of pixel data and whether or not the second plurality of pixel data is in a saturation state, in which the first set of merging weights weight the second plurality of pixel data more heavily than the first plurality of pixel data, and in which the second set of merging weights weight the first plurality of pixel data more heavily than the second plurality of pixel data; and
      merge the first plurality of pixel data and the second plurality of pixel data, using the selected first or second set of merging weights, to generate a merged image.

10. The ADAS of claim 9, wherein the imaging system further comprises an image sensor.

11. The ADAS of claim 10, wherein the at least one processor is configured to detect flicker in the first plurality of pixel data in response to determining that pixel data in the first plurality of pixel data are below a low intensity threshold.

12. The ADAS of claim 11, wherein the low intensity threshold is based on a full well capacity of the image sensor divided by an intensity ratio.

13. The ADAS of claim 10, wherein the image sensor comprises a complementary metal oxide semiconductor (CMOS) wide dynamic range (WDR) image sensor.

14. The ADAS of claim 10, wherein the image system further comprises:
   a video recognition processor; and
   a non-transitory storage medium storing a program of instructions for execution by the at least one processor to perform operations.

15. The ADAS of claim 9,
   wherein the second exposure time is set to be greater than an inverse of a frequency of a light-emitting diode (LED) of a plurality of LEDs, and
   wherein LEDs of the plurality of LEDs have different frequencies.

16. A non-transitory computer readable storage medium storing a program for execution by at least one processor, the program including instructions to:
   receive a first plurality of pixel data having a first exposure time;
   receive a second plurality of pixel data having a second exposure time, wherein the first exposure time is less than the second exposure time;
   detect whether flicker is present in the first plurality of pixel data;
   detect whether the second plurality of pixel data is in a saturation state;
   select a first or second set of merging weights based on whether or not flicker is detected in the first plurality of pixel data and whether or not the first plurality of pixel data is in the saturation state, in which the first set of merging weights weight the second plurality of pixel data more heavily than the first plurality of pixel data, and in which the second set of merging weights weight the first plurality of pixel data more heavily than the second plurality of pixel data; and
   merge the first plurality of pixel data and the second plurality of pixel data, using the selected first or second set of merging weights, to generate a merged image.

17. The method of claim 1, wherein detecting flicker in the first plurality of pixel data corresponds to detecting that a light-emitting diode causing the flicker is in an off state or a partially off state.

18. The method of claim 1,
   wherein the first set of merging weights is selected in response to detecting flicker in the first plurality of pixel data or not detecting that the saturation state is present in the second plurality of pixel data, and
   wherein the second set of merging weights is selected in response to not detecting flicker in the first plurality of pixel data and detecting that the saturation state is present in the second plurality of pixel data.

19. The ADAS of claim 9,
   wherein the first set of merging weights is selected in response to detecting flicker in the first plurality of pixel data or not detecting that the saturation state is present in the second plurality of pixel data, and
   wherein, the second set of merging weights is selected in response to not detecting flicker in the first plurality of pixel data and detecting that the saturation state is present in the second plurality of pixel data.

20. The non-transitory computer readable storage medium of claim 16,
   wherein the instructions to select the first set of merging weights comprise instructions to select the first set of merging weights in response to detecting flicker in the first plurality of pixel data or not detecting that the saturation state is present in the second plurality of pixel data, and
   wherein the instructions to select the second set of merging weights comprise instructions to select the second set of merging weights in response to not detecting flicker in the first plurality of pixel data and detecting that the saturation state is present in the second plurality of pixel data.

* * * * *